(12) United States Patent
Diard

(10) Patent No.: US 9,679,530 B2
(45) Date of Patent: Jun. 13, 2017

(54) COMPRESSING GRAPHICS DATA RENDERED ON A PRIMARY COMPUTER FOR TRANSMISSION TO A REMOTE COMPUTER

(75) Inventor: Franck Diard, Saint-Contest (FR)

(73) Assignee: NVIDIA Corporation, Santa Clara, CA (US)

(*) Notice: Subject to any disclaimer, the term of this patent is extended or adjusted under 35 U.S.C. 154(b) by 737 days.

(21) Appl. No.: 13/460,720

(22) Filed: Apr. 30, 2012

(65) Prior Publication Data

US 2013/0286034 A1  Oct. 31, 2013

(51) Int. Cl.
| | |
|---|---|
| G09G 1/02 | (2006.01) |
| G09G 5/02 | (2006.01) |
| G06F 3/14 | (2006.01) |
| G09G 5/39 | (2006.01) |
| G06T 9/00 | (2006.01) |
| G06T 15/00 | (2011.01) |
| G09G 5/36 | (2006.01) |

(52) U.S. Cl.
CPC ............. *G09G 5/02* (2013.01); *G06F 3/1454* (2013.01); *G06T 9/00* (2013.01); *G06T 15/005* (2013.01); *G09G 5/39* (2013.01); *G09G 5/363* (2013.01); *G09G 2340/02* (2013.01); *G09G 2350/00* (2013.01)

(58) Field of Classification Search
CPC .... H04N 7/0125; H04N 7/0145; H04N 8/182; H04N 19/61; G06F 12/0875; G06F 3/0317; G06F 3/1454; G09G 5/14; G09G 5/006; G09G 2340/02; G09G 2350/00; G09G 5/02; G09G 5/363; G09G 5/39; G06T 15/005; G06T 9/00

USPC ............... 345/552, 543, 473, 660; 715/734; 382/166; 709/230, 231
See application file for complete search history.

(56) References Cited

U.S. PATENT DOCUMENTS

| | | | | |
|---|---|---|---|---|
| 5,404,447 | A * | 4/1995 | Drako | G06F 7/544 345/501 |
| 5,845,083 | A * | 12/1998 | Hamadani | H04N 19/61 348/403.1 |
| 6,094,204 | A * | 7/2000 | Takizawa | 345/556 |
| 6,373,890 | B1 * | 4/2002 | Freeman | H04N 19/00 358/539 |
| 6,693,644 | B1 * | 2/2004 | Moriwaki et al. | 345/604 |
| 6,704,021 | B1 | 3/2004 | Rogers et al. | |
| 6,708,217 | B1 | 3/2004 | Colson et al. | |

(Continued)

OTHER PUBLICATIONS

Office Action dated May 7, 2014 for U.S. Appl. No. 13/329,994.

*Primary Examiner* — Sing-Wai Wu
(74) *Attorney, Agent, or Firm* — Artegis Law Group, LLP

(57) ABSTRACT

One embodiment of the present invention sets forth a method for compressing via a pixel shader color information associated with a line of pixels. An intermediary representation of an uncompressed stream of color information is first generated that indicates, for each pixel, whether a previous adjacent pixel shares color information with the pixel. A set of cascading buffers is then generated based on intermediary representation, where each cascading buffer represents a number of unique color codes across different groups of pixels. Finally, a compressed output stream that specifies the unique color codes as well as the number of pixels that share each unique color code is generated based on the set of cascading buffers.

20 Claims, 8 Drawing Sheets

(56) References Cited

U.S. PATENT DOCUMENTS

| | | | |
|---|---|---|---|
| 6,714,200 | B1 | 3/2004 | Talnykin et al. |
| 7,173,635 | B2 | 2/2007 | Amann et al. |
| 8,254,704 | B2 * | 8/2012 | Lu et al. .................. 382/232 |
| 2002/0065915 | A1 | 5/2002 | Anderson et al. |
| 2007/0038939 | A1 | 2/2007 | Challen et al. |
| 2007/0245119 | A1 | 10/2007 | Hoppe |

* cited by examiner

COMPRESSING GRAPHICS DATA RENDERED ON A PRIMARY COMPUTER FOR TRANSMISSION TO A REMOTE COMPUTER

BACKGROUND OF THE INVENTION

Field of the Invention

The present invention relates generally to remote access, and, more specifically, to compressing graphics data rendered on a primary computer for transmission to a remote computer.

Description of the Related Art

Desktop sharing technologies enable the remote access of a primary computer via graphical terminal that executes on a secondary computer. The graphical terminal allows a user of the secondary computer to view and access any applications executing on the primary computer. To enable the operations of the graphics terminal, a server process typically executes on the primary computer that collects graphics data related to applications executing on the primary computer and transmits the collected graphics data to the secondary computer.

There are several drawbacks to currently available desktop sharing technologies. First, when the secondary computer connects to the primary computer, applications executing on the primary computer typically encounter a negative side effects. For example, a gaming application executing on the primary computer may exit when the secondary computer connects to the primary computer. Importantly, current desktop sharing technologies do not provide a smooth transition to applications executing on the primary computer when a connection between the primary computer and the secondary computer is established. Second, because the display resolution at the primary computer and the display resolution at the secondary computer are often different, the graphical display of the primary computer may be modified to match the display resolution of the secondary computer. Matching the display resolutions in such a manner may adversely affect the graphics that are displayed at the primary computer and impact the overall display quality for any user viewing the graphics displayed at the primary computer. Third, current desktop sharing technologies consume a significant amount of processing and network bandwidth when collecting and transmitting graphics data to the secondary computer. This negatively impacts the overall performance of the primary computer, and, oftentimes, renders the primary computer unusable.

As the foregoing illustrates, what is needed in the art is a mechanism for efficiently transmitting graphics data to a remote computer.

SUMMARY OF THE INVENTION

One embodiment of the present invention sets forth a method for compressing color information specified by pixel data. The method includes the steps of receiving an input stream of data that includes color information associated with a plurality of pixels and processing the input stream to generate a second stream of data. The second stream of data indications, for each pixel in the plurality of pixels, whether a second pixel that also is included in the plurality of pixels and is adjacent to the pixel shares a color code with the pixel. A buffer is then generated that includes multiple buffer locations that each corresponds to a different pair of pixels included in the plurality of pixels. The buffer locations are populated based on the second stream of data such that each buffer location included in the first set of buffer locations indicates how many unique color codes are associated with the different pair of pixels corresponding to the buffer location. Finally, a compressed stream of data that includes one or more compressed codes is generated based on the buffer locations in the buffer. Each compressed code in the compressed stream of data indicates a different color code and a number of adjacent pixels included in the plurality of pixels that share the different color code.

Advantageously, the technique for collecting and transmitting graphics data to the secondary computer described herein allows for a smooth transition when the client process connects to or disconnects from the server process as the behavior of the primary computer and applications executing within the primary computer 102 are not modified. In addition, because the commands for generating and collecting graphics data and the commands for modifying the graphics data for transmission are transmitted to the GPU on different channels, the operation of graphics application is not slowed down or stalled by the operation of the server process. Lastly, because the GPU is able to perform a DMA operation to transfer graphics data to system memory, the performance of the server computer is not impacted based on such a transfer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
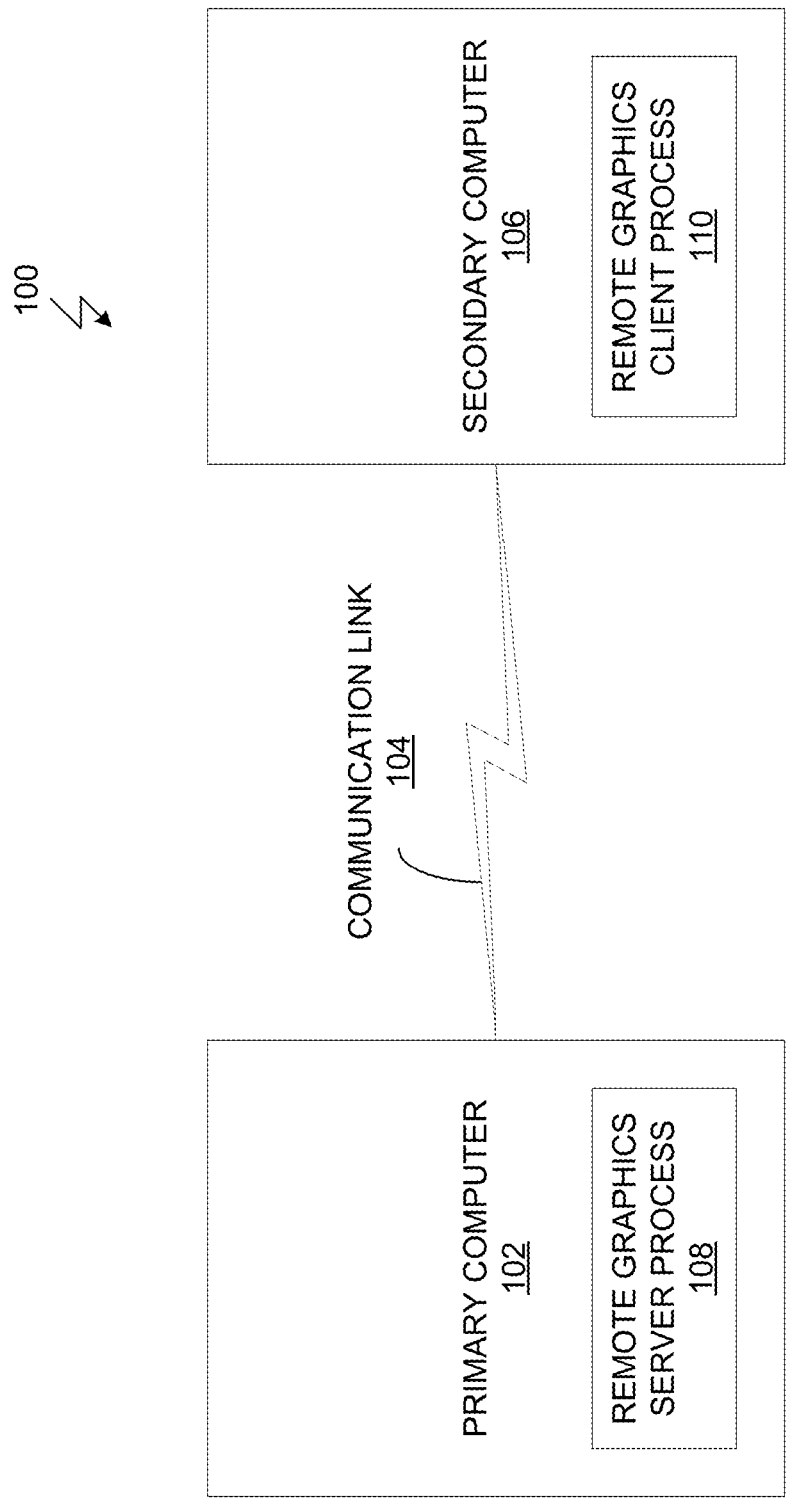
FIG. 1 illustrates a remote computing environment, according to one embodiment of the invention.

FIG. 1 illustrates a remote computing environment 100, according to one embodiment of the invention. As shown, the remote computing environment 100 includes a primary computer 102, a secondary computer 106 and a communications link 104.

The secondary computer 106 includes a remote graphics client process 110 (referred to herein as the "client process 110") that communicates with a remote graphics server process 108 (referred to herein as the "server process 108") included in the primary computer 102 via the communications link 104. The client process 110 allows a user to remotely connect to the primary computer 102 such that any graphics that is rendered and displayed on the primary computer 102 is transmitted to and displayed on the secondary computer 106.

In operation, the server process 108, when initialized on the primary computer 102, waits until a connection is initiated by the client process 110. When initiating a connection, the client process 110 may transmit additional information such as the resolution of a display device (not shown) coupled to the secondary computer 106. In response to a connection from the client process 110, the server process 108 begins to collect graphics data that was rendered for display on a display device (not shown) coupled to the primary computer 102, compress the graphics data and transmit the compressed graphics data to the client process 110 via the communications link 104. The client process 110 receives compressed graphics data from the server process 108, decompresses the graphics data and displays the decompressed graphics data on the display device coupled to the secondary computer 106. The transmission from the server process 108 to the client process 110 continues until the client process 110 terminates the connection between the server process 108 and the client process 110. In addition, the client process 110 collects inputs, such keyboard key strokes or mouse inputs, at the secondary computer 106 and transmits the inputs to the server process 108. The server process 108 captures the received inputs and causes the inputs to effect the operation of the primary computer 102 or applications executing within the server 102.

The communications link 104 includes a plurality of network communications systems, such as routers and switches, configured to facilitate data communication between the client process 110 and the server process 108. Persons skilled in the art will recognize that many technically feasible techniques exist for building the communications link 104, including technologies practiced in deploying the well-known internet communications network.

The primary computer 102 and the secondary computer 106 may be any type of computing device including, but not limited to, a desktop personal computer (PC), a laptop, a tablet PC, a personal digital assistant (PDA) or a mobile device, such as a mobile phone.

In one embodiment, a plurality of secondary computers, such as the secondary computer 106, can connect to the primary computer 102 simultaneously via corresponding client processes.

Figure 2:
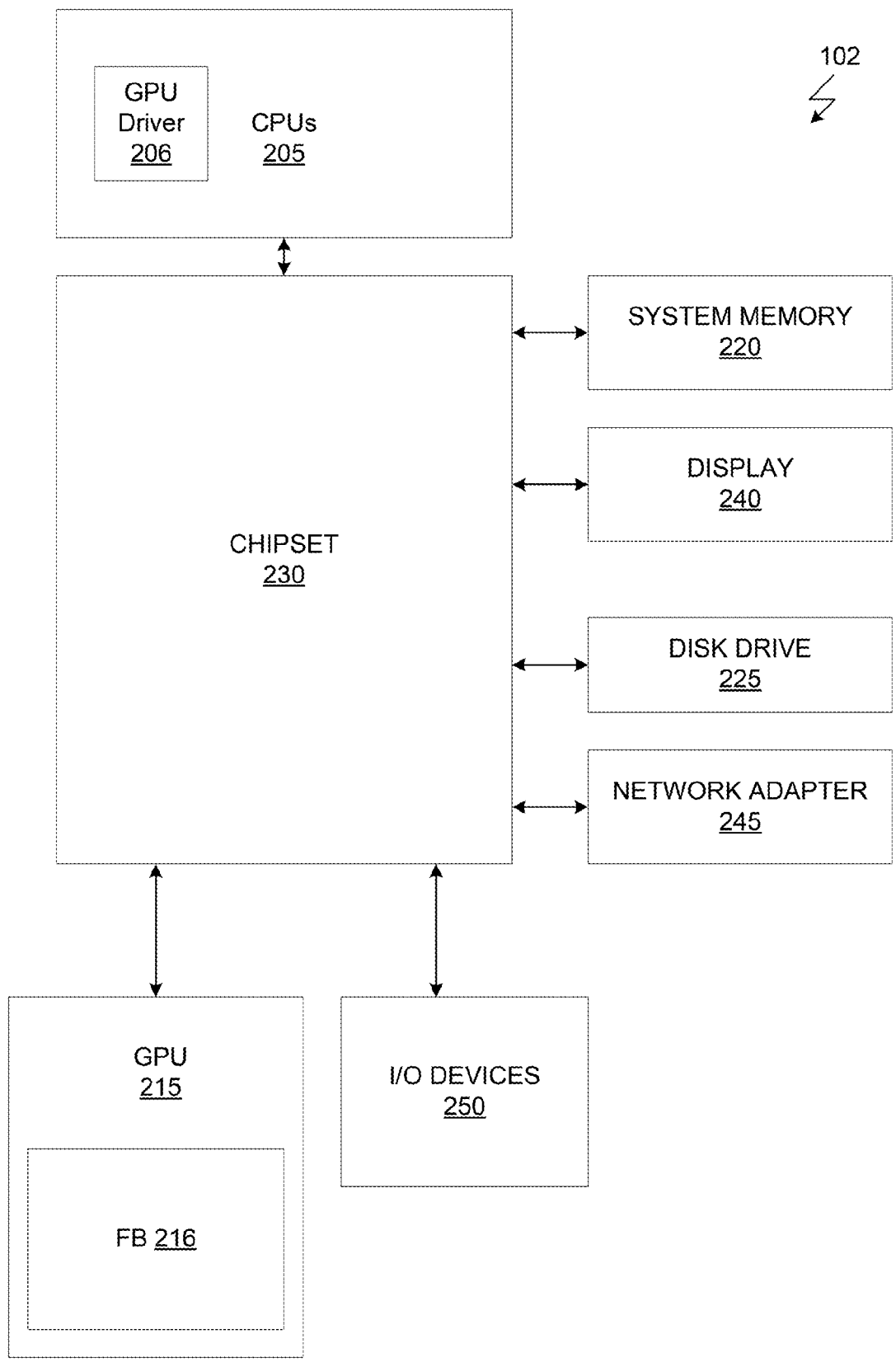
FIG. 2 illustrates a more detailed view of the primary computer of FIG. 1, according to one embodiment of the present invention.

FIG. 2 illustrates a more detailed view of the primary computer 102 of FIG. 1, according to one embodiment of the present invention. As shown, the primary computer 102 includes one or more central processing units (CPUs) 205, a graphics processing unit (GPU) 215, a chipset 230, system memory 220, a disk drive 225, display device 240, network adapter 245 and I/O devices 250 communicatively coupled by one or more busses (not shown). In addition, the GPU 215 includes a frame buffer 216.

The chipset 230 is configured as an input/output hub for communicating data and instructions between the CPU 205, the GPU 215, the system memory 220, the disk drive 225 and the peripheral devices 240, 245 and 250. The peripheral devices 215, 240-265 may include the display device 240, a network adapter (e.g., Ethernet card) 245, CD drive, DVD drive, a keyboard, a pointing device, a speaker, a printer, and/or the like.

In operation, the server process 108 described above executes on the CPU 205 and collects graphics data related to other applications executing on the CPU 205 and rendered by the GPU 215. The operations of the GPU 215 are described in greater detail below in conjunction with FIG. 3. The collected graphics data is then compressed and transmitted to the client process 110 over the communications link 104 via the network adapter 245. The operation of the server process 108 with respect to collecting, compressing and transmitting the graphics data is described in greater detail below in conjunction with FIG. 4.

Figure 3:
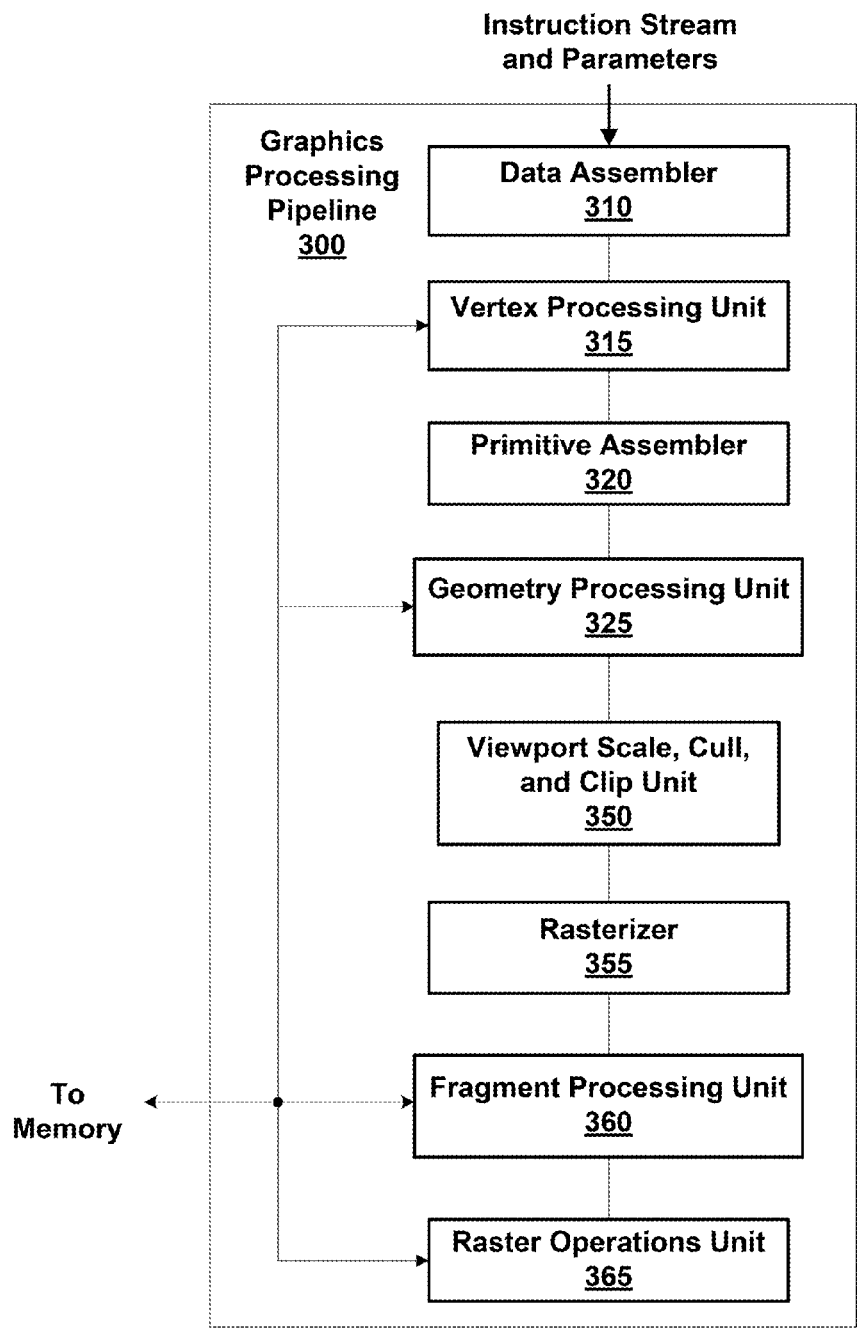
FIG. 3 is a conceptual diagram of a graphics processing pipeline that the GPU of FIG. 2 can be configured to implement, according to one embodiment of the present invention.

FIG. 3 is a conceptual diagram of a graphics processing pipeline 300, that the GPU 215 of FIG. 2 can be configured to implement, according to one embodiment of the present invention.

Data assembler 310 processing unit collects vertex data for high-order surfaces, primitives, and the like, and outputs the vertex data, including the vertex attributes, to vertex processing unit 315. Vertex processing unit 315 is a programmable execution unit that is configured to execute vertex shader programs, lighting and transforming vertex data as specified by the vertex shader programs. For example, vertex processing unit 315 may be programmed to transform the vertex data from an object-based coordinate representation (object space) to an alternatively based coordinate system such as world space or normalized device coordinates (NDC) space. Vertex processing unit 315 may read data that is stored in a memory coupled to the GPU 215 by data assembler 310 for use in processing the vertex data.

Primitive assembler 320 receives vertex attributes from vertex processing unit 315, reading stored vertex attributes, as needed, and constructs graphics primitives for processing by geometry processing unit 325. Graphics primitives include triangles, line segments, points, and the like. Geometry processing unit 325 is a programmable execution unit that is configured to execute geometry shader programs, transforming graphics primitives received from primitive assembler 320 as specified by the geometry shader programs. For example, geometry processing unit 325 may be programmed to subdivide the graphics primitives into one or more new graphics primitives and calculate parameters, such as plane equation coefficients, that are used to rasterize the new graphics primitives.

In some embodiments, geometry processing unit 325 may also add or delete elements in the geometry stream. Geometry processing unit 325 outputs the parameters and vertices specifying new graphics primitives to a viewport scale, cull, and clip unit 350. Geometry processing unit 325 may read data that is stored in parallel processing memory 203 or system memory 103 for use in processing the geometry data. Viewport scale, cull, and clip unit 350 performs clipping, culling, and viewport scaling and outputs processed graphics primitives to a rasterizer 355.

Rasterizer 355 scan converts the new graphics primitives and outputs fragments and coverage data to fragment processing unit 360. Additionally, rasterizer 355 may be configured to perform z culling and other z-based optimizations.

Fragment processing unit 360 is a programmable execution unit that is configured to execute fragment shader programs, transforming fragments received from rasterizer 355, as specified by the fragment shader programs. For example, fragment processing unit 360 may be programmed to perform operations such as perspective correction, texture mapping, shading, blending, and the like, to produce shaded fragments that are output to raster operations unit 365. Fragments may be shaded at pixel, sample, or other granularity, depending on the programmed sampling rate.

Raster operations unit 365 is a processing unit that performs raster operations, such as stencil, z test, blending, and the like, and outputs pixel data as processed graphics data for storage in graphics memory. The processed graphics data may be stored in graphics memory coupled to the GPU 215 for display on display device 240 or for further processing by CPU 102. In some embodiments of the present invention, raster operations unit 365 is configured to compress z or color data that is written to memory and decompress z or color data that is read from memory.

Figure 4:
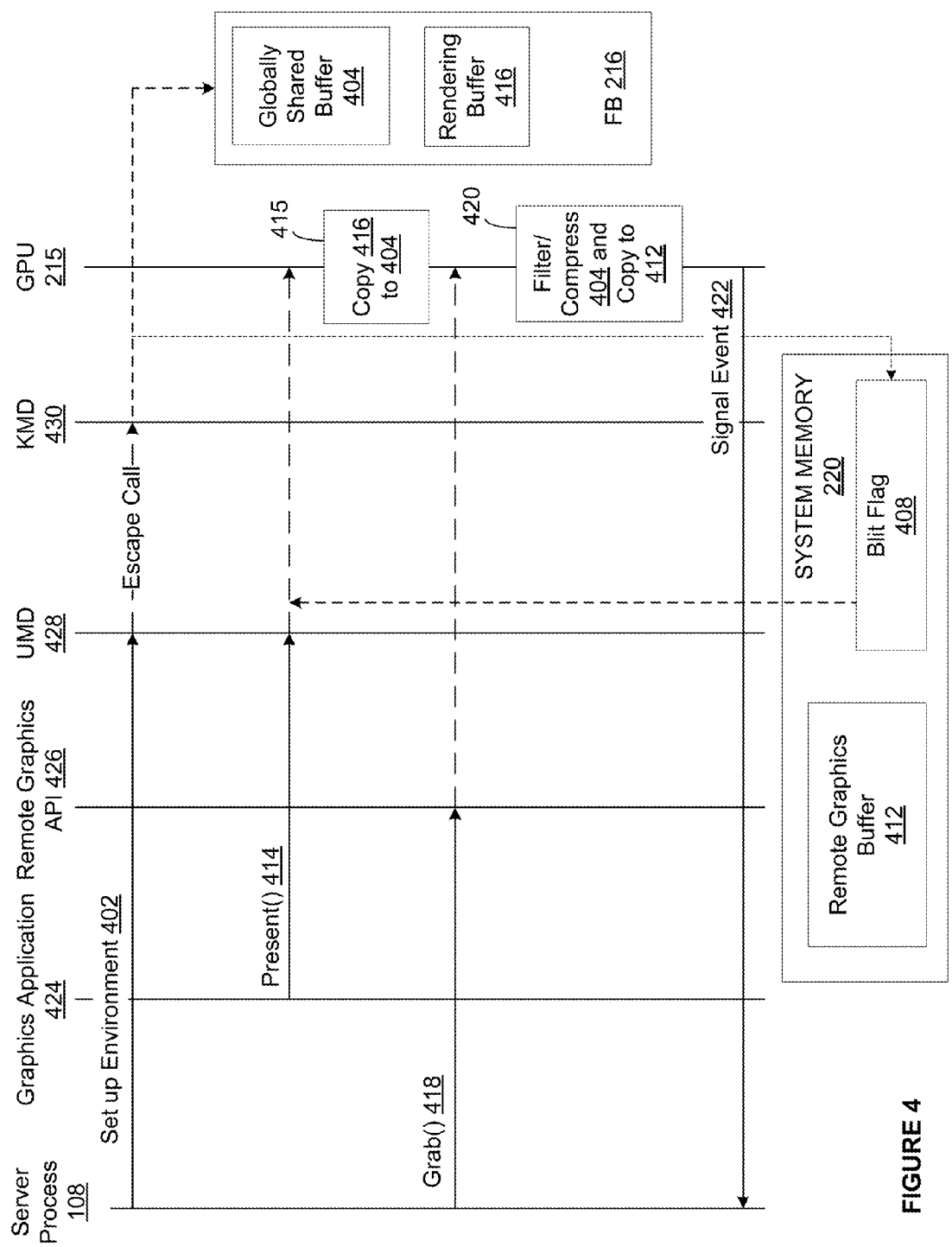
FIG. 4 illustrates a technique that enables the transmission of rendered graphics data to the client process, according to one embodiment of the invention.

FIG. 4 illustrates a technique that enables the transmission of rendered graphics data to the client process 110, according to one embodiment of the invention. The technique has three distinct portions. First, setting up a shared buffer to collect rendered graphics data for transmission to the client process 110. Step 402 is directed to the first portion. Second, configuring the GPU 215 to store rendered graphics data in the shared buffer. Steps 414-415 are directed to the second portion. Third, grabbing the rendered graphics data from the shared buffer for transmission to the client process 110. Steps 418-422 are directed to the third portion.

When a connection between the client process 110 and the server process 108 is established, the server process 108, at step 402, transmits a request to the remote graphics API 426 via the frame buffer access API 318 to set up the environment for transmitting rendered graphics data from the shared buffer for transmission to the client process 110. The remote graphics API 426 transmits the request to the instance of a device user mode driver (UMD) 428 associated with the server process 108. In response, the device UMD 428 performs two operations.

First, the device UMD 428 allocates the remote graphics buffer 412 in the system memory 220 for storing the graphics data to be transmitted to the client process 110. The remote graphics buffer 412 is configured such that a direct memory access operation can be performed by the GPU 215 to transfer data between the frame buffer 216 and the remote graphics buffer 412. Second, the device UMD 428 transmits an escape call to a kernel mode driver (KMD) 430. In response to the escape call, the KMD 430 initializes the globally shared buffer 406 within the frame buffer 216. The globally shared buffer 404 is associated with the server process 108. Also in response to the escape call, the KMD 430 sets the blit flag 408 within the system memory 220 to valid. Each graphics application executing within the primary computer 102, such as graphics application 424, can access the blit flag 408 via the instance of the device UMD 428 associated with the graphics application. When set, the blit flag 408 indicates to the graphics applications that the server process 108 is collecting rendered graphics data for transmission to the client process 110.

At step 414, the graphics application 424 transmits a graphics command stream that includes a present( ) call to the instance of the device UMD 428 associated with the graphics application 424 for transmission to the GPU 215. The graphics command stream includes one or more commands for rendering graphics data associated with the graphics application 424. The present( ) call that, when processed, causes the rendered graphics data associated with the graphics application 424 to be displayed on the display device 240.

When the graphics command stream includes a present( ) call, the device UMD 428 determines whether graphics data is being collected for transmission to the client process 110. To make such a determination, the device UMD 428 accesses the blit flag 408 to determine if the blit flag 408 is set. Again, when set, the blit flag 408 indicates that the server process 108 is collecting rendered graphics data for transmission to the client process 110. If the device UMD 428 determines that graphics data is being collected for transmission to the client process 110, then the device UMD 428 inserts commands into the graphics command stream that cause the GPU 215 to copy any rendered graphics data generated as a result of the command stream to the globally shared buffer 404 that was initialized by the server process 108 at step 402.

The GPU 215, in response to receiving the graphics command stream, renders the graphics data and stores the rendered graphics data in the cascading buffer 416 included in the frame buffer 216. Further, if the device UMD 428 inserted commands to copy the rendered graphics data to the globally shared buffer 404, then the GPU 215, at step 415, copies the rendered graphics data from the cascading buffer 416 to the globally shared buffer 404 via a blit operation.

At step 418, the server process 108, via the frame buffer access API 318, transmits a request to the remote graphics API 426 to "grab" the rendered graphics data stored in the globally shared buffer 404. The remote graphics API 426, via the device UMD 428, transmits commands to the GPU 215, that, when executed by the GPU 215, causes the GPU 215, at step 420, to perform one or more scaling, filtering or pixel shading operations, such as compression, on the graphics data stored in the globally shared buffer 404. The operations may include scaling the graphics data based on a resolution associated with the secondary computer 106 that was received when the remote graphics connection between the client process 110 and the server process 108 was established. The operations may also include applying a pixel shader to the graphics data to preserve the quality of the graphics data while scaling. Any other technically feasible graphics operation can be performed on the graphics data stored in the globally shared buffer 404.

The resulting graphics data is copied by the GPU 215 to the remote graphics buffer 412 via a direct memory access (DMA) operation. As previously described herein, the remote graphics buffer 402 is configured such that the GPU 215 can directly transfer data to the remote graphics buffer 412 from the frame buffer 216. In one embodiment, the graphics data resulting from the filtering/scaling/shading operations is stored in a temporary buffer before being copied to the remote graphics buffer 412. At step 422, when the GPU 215 completes the DMA operation, the GPU 215 raises an event that is transmitted to the server process 108 and indicates that the DMA operation is complete.

The server process 108 can then optionally perform compression operations on the graphics data stored in the remote graphics buffer 402. The graphics data is then transmitted to the client process 110 via the communications link 104. The client process 110 decompresses the graphics data, and the decompressed graphics data is displayed on a display device (not shown) coupled to the secondary computer 106.

Figure 5A:
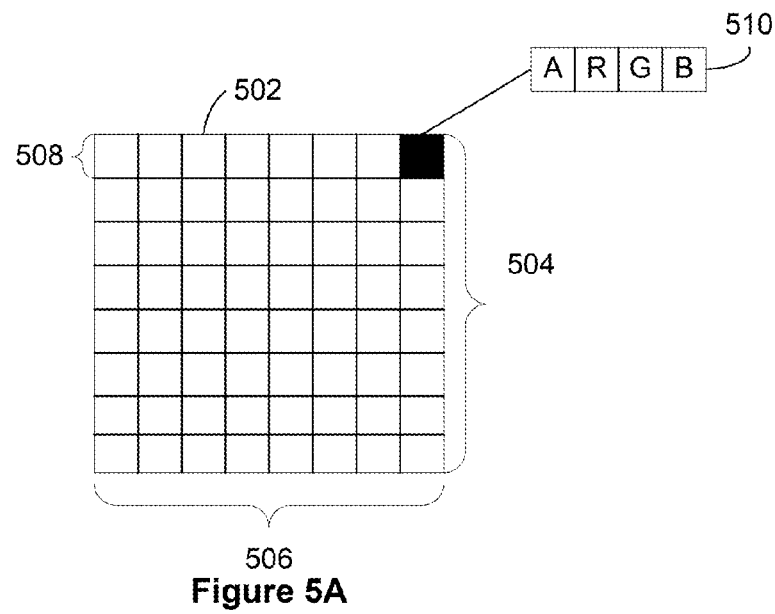
FIG. 5A illustrates a block of pixel data generated by the GPU, according to one embodiment of the invention.

FIG. 5A illustrates a block of pixel data 502 generated by the GPU 215, according to one embodiment of the invention. As shown, the block of pixel data 502 includes lines of pixel data 504, each line of pixel data having a width 506. Each line of pixel data, such as line 508, includes pixel data associated with multiple pixels. Pixel data associated with a particular pixel identifies color information associated with that pixel. For example, pixel data associated with the last pixel in line 508 identifies the color information 510 associated with the last pixel. In one embodiment, pixel data associated with a particular pixel includes four portions, one portion each for storing the "R," "G," and "B" components of the color information (referred to herein as the "color code") and one portion that is empty.

Figure 5B:
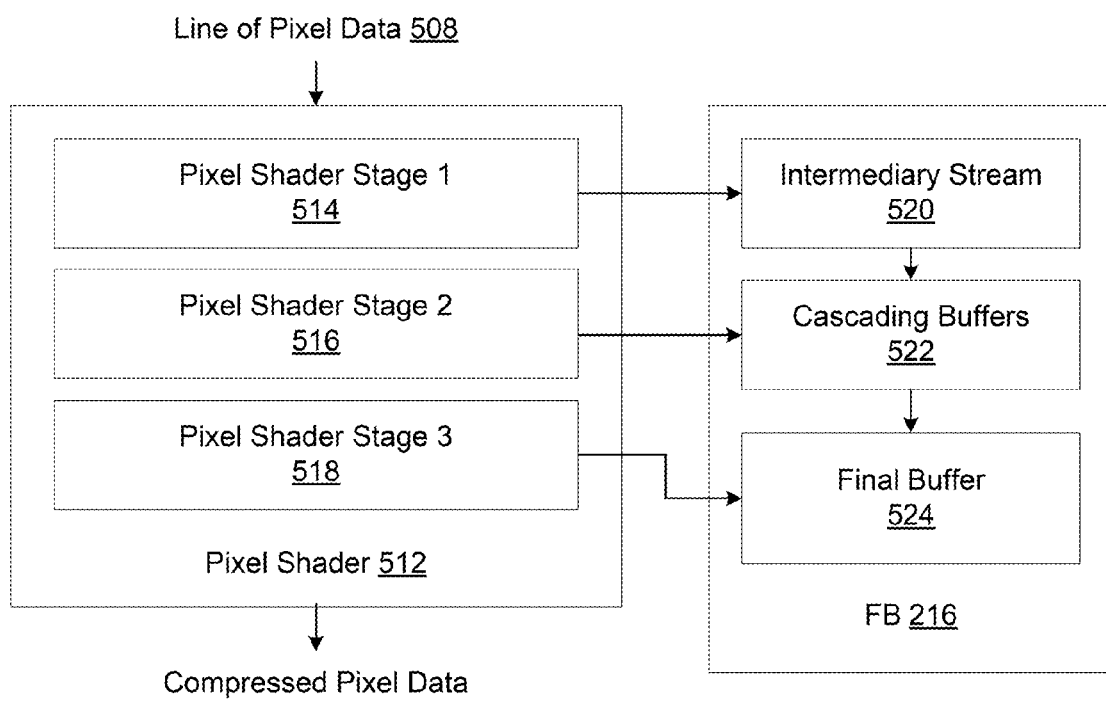
FIG. 5B illustrates different stages of a pixel shader configured to compress the block of pixel data of FIG. 5A, according to one embodiment of the invention.

FIG. 5B illustrates different stages of a pixel shader 512 configured to compress the block of pixel data of FIG. 5A. As shown, the pixel shader 512 includes pixel shader stage 1 514, pixel shader stage 2 516 and pixel shader stage 3 518. The pixel shader 512 processes a line of pixel data, such as the line of pixel data 508, one at a time.

The pixel shader 512 is configured to compress lines of pixel data for efficient transmission to a remote client computer. The pixel shader 512 receives the lines of pixel data from an upstream element in the graphics processing pipeline 300, such as the rasterizer 355. In one embodiment, the pixel shader 512 operates on the input stream after the server process 108, via the frame buffer access API 318, transmits a request to the remote graphics API 426 to "grab" the rendered graphics data stored in the globally shared buffer 404. The pixel shader 512 is configured to run on each pixel data independently and operates in three stages, pixel shader stage 1 514, pixel shader stage 2 516 and pixel shader stage 3 518. The operation of pixel shader stage 1 514, pixel shader stage 2 516 and pixel shader stage 3 518 on the line of pixel data 508 (referred to herein as "the input stream") is discussed below.

The pixel shader stage 1 514 processes the input stream to generate an intermediary stream 520 having an index location corresponding to each pixel for which color information is included in the input stream. When processing the input stream, the pixel shader stage 1 determines whether the color information associated with a particular pixel matches the color information associated with a prior pixel adjacent to the particular pixel in screen space (referred to herein as the "adjacent pixel"). If, for a particular pixel, the color information associated with that pixel and the prior adjacent pixel is the same, then the index location in the intermediary stream 520 that corresponds to the pixel is updated to reflect that the color information associated with the two pixels is the same. When the pixel corresponding to the index location shares the same color code with a prior adjacent pixel, then the color code associated with the pixel is not a unique color code. Conversely, when the pixel corresponding to the index location does not share the same color code with a prior adjacent pixel, then the color code associated with the pixel is a unique color code. The index location in the intermediary stream 520 that corresponds to the first pixel in the line of pixels reflects that the color information associated with the first pixel is the same as the adjacent pixel even though there is no pixel that is located prior the first pixel in screen space.

To illustrate the operation of the pixel shader stage 1 514, suppose the input stream includes color information associated with four pixels, 1, 2, 3 and 4, pixel 1 having color A, pixel 2 having color A, pixel 3 having color B and pixel 4 having color A. The index location in the intermediary stream 520 that corresponds to pixel 1 reflects that the color information associated with the first pixel is the same as the adjacent pixel even though there is no pixel that is located prior the first pixel in screen space. The index location in the intermediary stream 520 that corresponds to pixel 2 reflects that the that the color information associated with pixel 2 and pixel 1 (the prior adjacent pixel) is the same. The index location in the intermediary stream 520 that corresponds to pixel 3 reflects that the that the color information associated with pixel 3 and pixel 2 (the prior adjacent pixel) is not the same. Finally, the index location in the intermediary stream 520 that corresponds to pixel 4 reflects that the that the color information associated with pixel 4 and pixel 3 (the prior adjacent pixel) is not the same.

The pixel shader stage 2 516 processes the intermediary stream 520 to generate a set of cascading buffers 522. The number of buffers included in the set of cascading buffers 522 is logarithmically related to the number of pixels included in the input stream. For example, for an input stream having pixel data associated with eight pixels, three (log base 2 of 8) buffers are included in the set of cascading buffers 522. A first cascading buffer included in the set of cascading buffers 522 is half the size of the intermediary stream 520 and is populated based on the data stored in the intermediary stream 520. Each remaining cascading buffer in the set of cascading buffers 522 is half the size of the previous cascading buffer and is populated based on the data stored in a previous cascading buffer in the set of cascading buffers 522. The last cascading buffer in the set of cascading buffers 522 has only one index location, which indicates the number of unique color codes within the input stream. The mechanism for populating the set of cascading buffers 522 is described in greater detail below in conjunction with FIG. 6.

The pixel shader stage 3 518 processes the set of cascading buffers 522 to (i) identify each unique color code within the input stream and (ii) generate a compressed stream of data based on the input stream. To identify the unique color codes within the input stream, the pixel shader stage 3 518 first determines the number of the number of unique color codes within the input stream based on the last cascading buffer in the set of cascading buffers 522. For each unique color code, the pixel shader stage 3 518 then traverses each level of the cascading buffers to determine the specific index location within the intermediary stream 520 that corresponds to a pixel having a unique color code stored within the input stream. At each level of the remaining cascading buffers, the pixel shader stage 3 518 determines which portion of the next cascading buffer to read based on the unique color code is being identified and the values stored in the current cascading buffer. To generate the compressed stream, the pixel shader stage 3 518 stores each unique color code in an output stream within the final buffer 524. The output stream also stores, for each unique color code, the number of adjacent pixels within the input stream that share the unique color code. The mechanism for identifying the unique color codes and generating the output stream is discussed in greater detail below in conjunction with FIGS. 6 and 10.

In one embodiment, the intermediary stream 520 and the line of pixel data 508 are stored within the frame buffer 216 as textures, where each location within the intermediary stream 520 and the line of pixel data 508 is a texel. In such an embodiment, the pixel shader 512 is configured to read from all texels within a particular texture, but can only write to the texel corresponding to the current pixel being processed.

In one embodiment, a different pixel shader is provided in the pixel shader stage 3 518 for traversing each level of the set of cascading buffers 522 when identifying the index location of a particular unique color code. In an alternate embodiment, the populated set of cascading buffers 522 are packed into one large texture (not shown), where the indexes of the large texture correspond to the cascading buffers. For example, in a case where the set of cascading buffers include three cascading buffers of size one, two and four, respectively, the buffers are packed into a large texture such that, at index 0 of the large texture, the data stored in the last cascading buffer is stored, at index 1-2 of the large texture, the data stored in the second cascading buffers is stored, and, at index 3-6 of the large texture, the data stored in the first cascading buffers is stored. Once the large texture is populated, a single pixel shader is provided to traverse through the large texture such that, at every level, the pixel shader can determine which index locations within the large texture should be read next.

Figure 6:
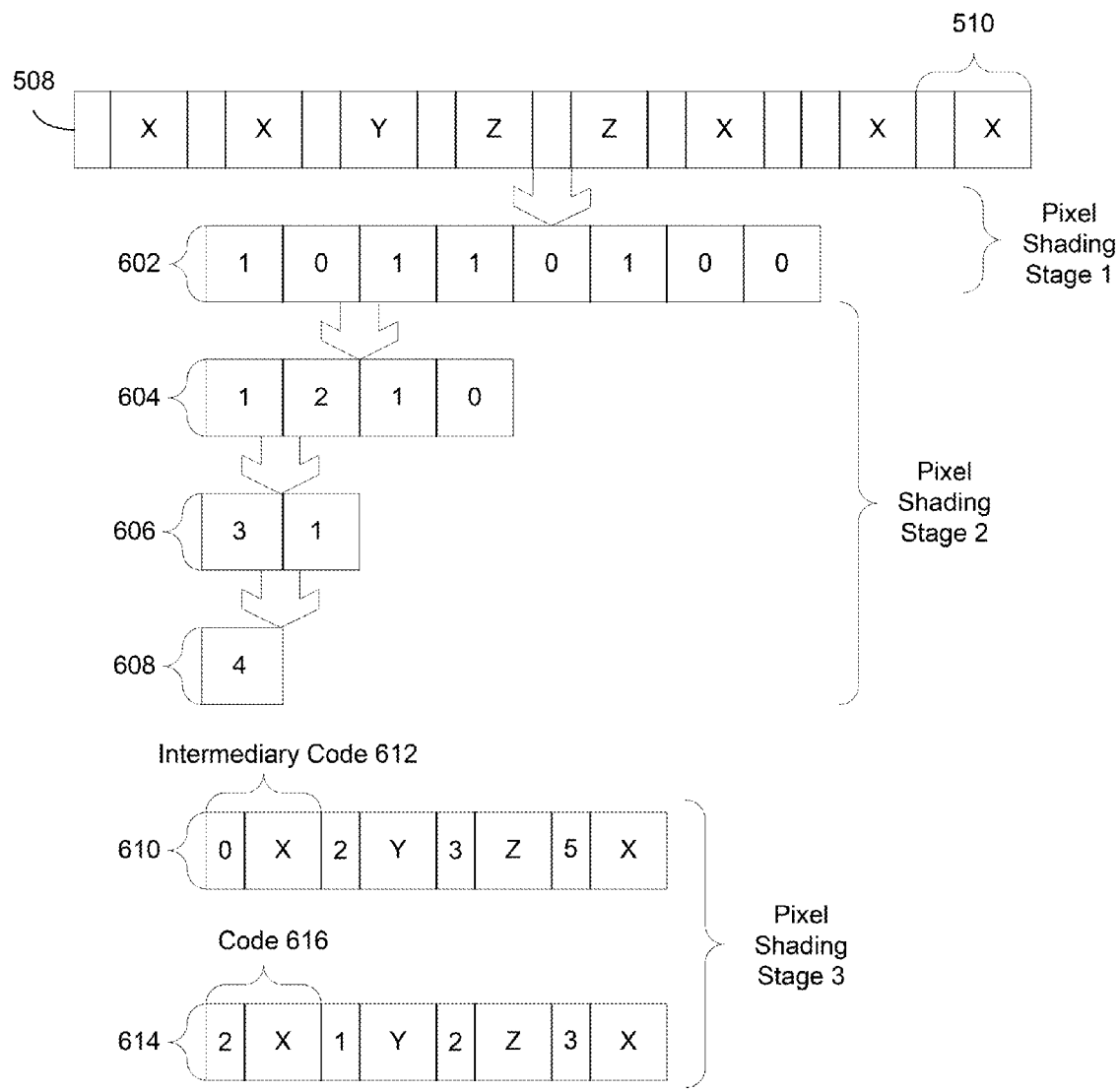
FIG. 6 is a conceptual diagram illustrating the operation of the different stages of the pixel shader when processing a line of pixel data, according to one embodiment of the invention.

FIG. 6 is a conceptual diagram illustrating the operation of the different stages of the pixel shader when processing the line of pixel data 508. As discussed above, the line of pixel data 508 includes a color code, such as color code 510, for each pixel associated with the line of pixel data 508.

The line of pixel data 508 is first processed by the pixel shader stage 1 514 to generate the intermediary stream 602. The intermediary stream 602 includes an index location corresponding to each pixel associated with the line of pixel data 508. Each index location in the intermediary stream 602 is populated by the pixel shader stage 1 514 based on whether the pixel corresponding to the index location shares the same color code with a previous adjacent pixel. As discussed above, when the pixel corresponding to the index location shares the same color code with a previous adjacent pixel, then the color code associated with the pixel is not a unique color code. Conversely, when the pixel corresponding to the index location does not share the same color code with a previous adjacent pixel, then the color code associated with the pixel is a unique color code.

Based on the intermediary stream 602, the pixel shader stage 2 516 generates cascading buffers 604, 606 and 608. The sizes of the cascading buffers 604, 606 and 608 are logarithmically related to each other and intermediary stream 602. More specifically, the first cascading buffer 604 is half the size of the intermediary stream 602, the second cascading buffer 606 is half the size of the first cascading buffer 604 and the last cascading buffer 608 is half the size of the second cascading buffer 606.

To populate the first cascading buffer 604, the pixel shader stage 2 516 sums each unique pair of index locations in the intermediary stream 602 and stores the result in a corresponding location in the first cascading buffer 604. For example, for the first pair of index locations in the intermediary stream 602, the pixel shader stage 2 516 sums "1" and "0" (the values stored in the index location 0 and 1 of the intermediary stream 502) and stores the result in index 0 of the first cascading buffer 604. Similarly, for the next pair of index locations in the intermediary stream 602, the pixel shader stage 2 516 sums "1" and "1" (the values stored in the index location 2 and 3 of the intermediary stream 502) and stores the result in index 1 of the first cascading buffer 604. In such a manner, the values stored at each pair of index locations within the intermediary stream 502 are summed and the resulting values are stored in the first cascading buffer 604.

To populate the second cascading buffer 606, the pixel shader stage 2 516 sums each unique pair of index locations in the first cascading buffer 604 and stores the result in a corresponding location in the second cascading buffer 606. For example, for the first pair of index locations in the first cascading buffer 604, the pixel shader stage 2 516 sums "1" and "2" (the values stored in the index location 0 and 1 of the first cascading buffer 604) and stores the result in index 0 of the second cascading buffer 606. Similarly, for the next pair of index locations in the first cascading buffer 604, the pixel shader stage 2 516 sums "1" and "0" (the values stored in the index location 2 and 3 of the first cascading buffer 604) and stores the result in index 1 of the second cascading buffer 606. In such a manner, the values stored at each pair of index locations within the first cascading buffer 604 are summed and the resulting values are stored in the second cascading buffer 606.

The pixel shader stage 2 516 populates the last cascading buffer 608 in a manner similar to populating the second cascading buffer 606. More specifically, each unique pair of index locations in the second cascading buffer 606 is summed and the result is stored in a corresponding location in the last cascading buffer 608. Since the second cascading buffer 606 only has one pair of index locations, index 0 and index 1, the last cascading buffer 608 has only one index location, index 0. The value stored at index 0 of the last cascading buffer 608 indicates the number of unique color codes within the input stream. Again, a unique color code is associated with a pixel that does not does not share the same color code with a previous adjacent pixel.

Once the cascading buffers 604, 606 and 608 are generated, the pixel shader stage 3 518 the cascading buffers to (i) identify each unique color code within the input stream and (ii) generate a compressed stream of data based on the input stream. The pixel shader stage 3 518 first traverses the cascading buffers 604, 606 and 608 to generate an intermediary output stream 610. The intermediary output stream 610 includes an intermediary code 612 for each unique color code within the input stream. The intermediary code 612 indicates the color information associated with the unique color code as well as the index location within the input stream at which the color information is located. To generate the intermediary code associated with a particular unique color code, the pixel shader stage 3 518 traverses the cascading buffers 604, 606 and 608 to determine the location within the input stream where the color code is located.

The pixel shader stage 3 518 then generates the final output stream 614 based on the intermediary codes stored in the intermediary output stream 610. The final output stream 614 includes a final code 616 for each unique color code within the input stream. The final code 616 for a particular unique color code indicates the color information associated with the unique color code as well as the number of adjacent pixels within the input stream that share the unique color code. To generate the final code 616 for a particular unique color code, the pixel shader stage 3 518 subtracts the index location specified by the intermediary code 612 of the next unique color code with the index location specified by the intermediary code 612 of the current unique color code. In such a manner, the value stored at each index location within the final output stream 614 specifies a final code 616 for a different unique color code within the input stream.

Figure 7A:
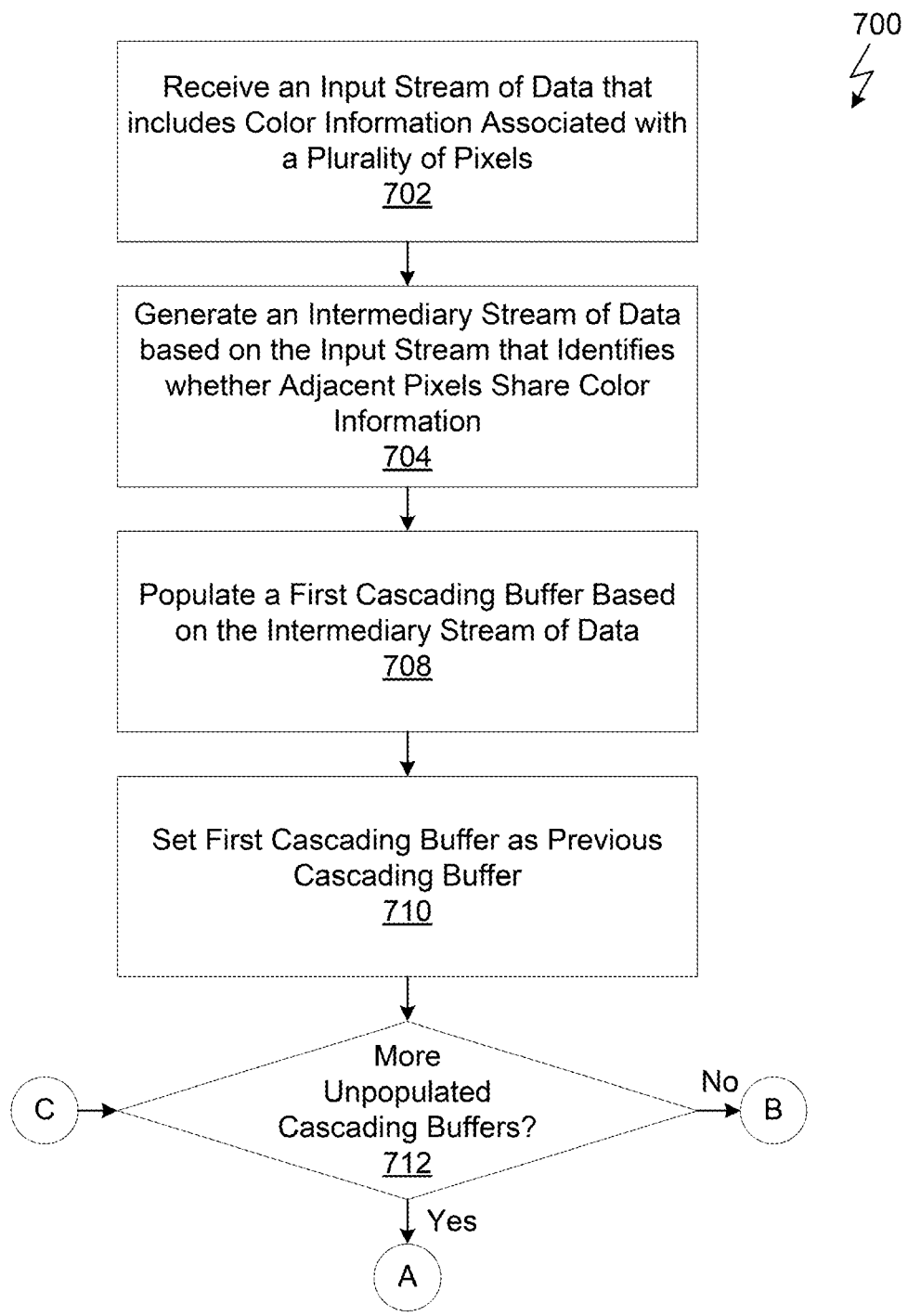
FIGS. 7A and 7B set forth a flow diagram of method steps for compressing a line of pixel data, according to one embodiment of the invention.
Figure 7B:
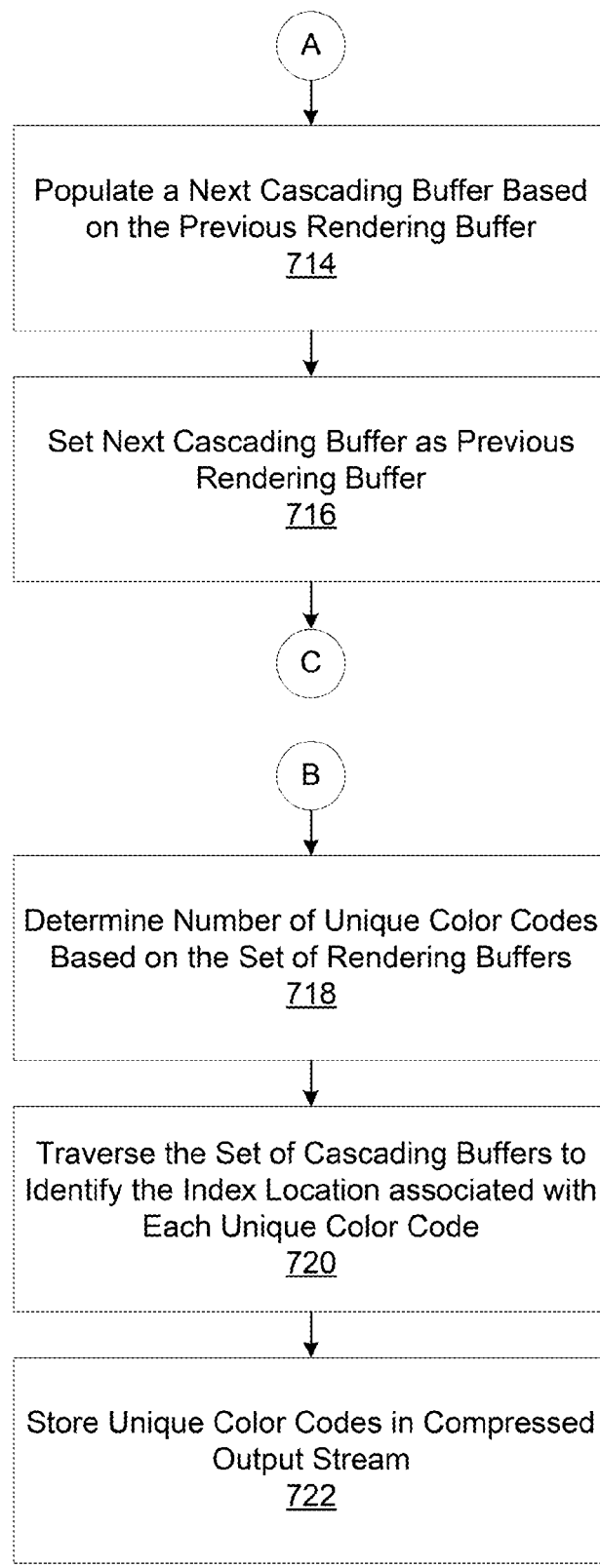

FIGS. 7A and 7B set forth a flow diagram of method steps for compressing a line of pixel data, according to one embodiment of the invention. Although the method steps are described in conjunction with the systems for FIGS. 1-6, persons skilled in the art will understand that any system configured to perform the method steps, in any order, is within the scope of the invention.

The method 700 begins at step 702, where the pixel shader 512 receives input stream of pixel data that includes color information associated with two or more pixels. At step 704, the pixel shader stage 1 514 processes the input stream to generate an intermediary stream that includes an index location corresponding to each pixel having color information included in the input stream. When processing the input stream, the pixel shader stage 1 determines whether the color information associated with a particular pixel matches the color information associated with a prior adjacent pixel. If, for a particular pixel, the color information associated with that pixel and the adjacent pixel is the same, then the index location in the intermediary stream that corresponds to the pixel is updated to reflect that the color information associated with the two pixels is the same.

At step 706, the pixel shader stage 2 516 sets up a set of cascading buffers, where the number of cascading buffers in the set is logarithmically related to the number of pixels included in the input stream. Further, a first cascading buffer included in the set is half the size of the intermediary stream and each remaining cascading buffer in the set is half the size of the previous cascading buffer. At step 708, the first cascading buffer in the set of cascading buffers is populated based on the data stored in the intermediary stream 520.

At step 710, the pixel shader stage 2 516 sets the first cascading buffer as the "previous cascading buffer." At step 712, the pixel shader stage 2 516 determines whether more cascading buffers that have not been populated exist in the set of cascading buffers. If so, then the method 700 proceeds to step 714. At step 714, the pixel shader stage 2 516 populates the next cascading buffer in the set of cascading buffers based on the data stored in the previous cascading buffer. At step 716, the pixel shader stage 2 516 sets the next cascading buffer as the "previous cascading buffer." The method 700 then returns to step 712 discussed above. In such a manner, the method 700 continues to loop until each cascading buffer in the set of cascading buffers is populated based on either the intermediary stream or a previous cascading buffer.

Referring back to step 712, if all the cascading buffers that have been populated, then the method proceeds to step 718. At step 718, the pixel shader stage 3 518 determines the number of unique color codes included in the input stream as indicated by the last cascading buffer in the set of cascading buffers. At step 720, the pixel shader stage 3 518, for each unique color code, traverses the set of cascading buffers and the intermediary stream to determine the specific index location within the intermediary stream 520 that corresponds to a pixel having a unique color code stored within the input stream. At step 722, the pixel shader stage 3 518 stores each unique color code in an output stream and the number of adjacent pixels within the input stream that share the unique color code within a compressed output stream.

Advantageously, the technique for compressing color information associated with a line of pixels allows for transmitting graphics data to a remote client faster. Since the compressed color information typically includes less bytes of data than uncompressed color information, transmitting the compressed color information also requires less bandwidth use. Therefore, the overall remote graphics experience is improved.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

I claim:

1. A method for compressing color information specified by pixel data, the method comprising:
receiving an input stream of data that includes color information associated with a block of pixels;
processing the input stream of pixel data to generate a second stream of data, wherein, for each pixel in the block of pixels, the second stream of data indicates whether a second pixel that also is included in the block of pixels and is adjacent to the pixel in the block of pixels shares a color code with the pixel;
populating a first set of buffer locations included in a first buffer based on the second stream of data, wherein each buffer location corresponds to a different pair of pixels included in the block of pixels, and wherein, once populated, each buffer location included in the first set of buffer locations indicates how many unique color codes are associated with the different pair of pixels corresponding to the buffer location;
generating a second buffer that includes a second set of buffer locations, wherein each buffer location included in the second set of buffer locations corresponds to a different pair of buffer locations included in the first set of buffer locations and a different group of four pixels included in the block of pixels; and
generating a compressed stream of data that includes one or more compressed codes based on the second set of buffer locations, wherein each compressed code indicates a separate color code and a number of adjacent pixels included in the block of pixels that share the separate color code.

2. The method of claim 1, wherein the first buffer comprises a texture buffer, and each buffer location included in the first set of buffer locations includes a byte of data that indicates how many unique color codes are associated with the different pair of pixels corresponding to the buffer location.

3. The method of claim 1, further comprising populating the second set of buffer locations based on the first buffer, wherein, once populated, each buffer location included in the second set of buffer locations indicates how many unique color codes are associated with the different group of four pixels corresponding to the buffer location.

4. The method of claim 3, wherein generating the compressed stream comprises, for a first color code, determining whether the first color code is associated with a first pair of pixels included in the group of four pixels or with a second pair of pixels included in the group of four pixels.

5. The method of claim 4, further comprising, when the first unique color code is associated with the first pair of pixels, determining whether the first unique color code is associated with a first pixel included in the first pair of pixels or with a second pixel included in the first pair of pixels based on the buffer location included in the first set of buffer locations that corresponds to the first pair of pixels.

6. The method of claim 4, further comprising, when the first unique color code is associated with the second pair of pixels, determining whether the first unique color code is associated with a first pixel included in the second pair of pixels or with a second pixel included in the second pair of pixels based on the buffer location included in the first set of buffer locations that corresponds to the second pair of pixels.

7. The method of claim 3, further comprising combining the first buffer and the second buffer to generate a third buffer, and wherein generating the compressed stream comprises reading the first set of buffer locations from the third buffer.

8. The method of claim 1, further comprising transmitting the compressed stream of data to a remote computer for display on a remote display device.

9. A non-transitory computer readable medium storing instructions that, when executed by a processor, cause the processor to compress color information specified by pixel data, by performing the steps of:
receiving an input stream of data that includes color information associated with a block of pixels;
processing the input stream of pixel data to generate a second stream of data, wherein, for each pixel in the block of pixels, the second stream of data indicates whether a second pixel that also is included in the block of pixels and is adjacent to the pixel in the block of pixels shares a color code with the pixel;
populating a first set of buffer locations included in a first buffer based on the second stream of data, wherein each buffer location corresponds to a different pair of pixels included in the block of pixels, and wherein, once populated, each buffer location included in the first set of buffer locations indicates how many unique color codes are associated with the different pair of pixels corresponding to the buffer location;
generating a second buffer that includes a second set of buffer locations, wherein each buffer location included in the second set of buffer locations corresponds to a different pair of buffer locations included in the first set of buffer locations and a different group of four pixels included in the block of pixels; and
generating a compressed stream of data that includes one or more compressed codes based on the second set of buffer locations, wherein each compressed code indicates a separate color code and a number of adjacent pixels included in the block of pixels that share the separate color code.

10. The non-transitory computer readable medium of claim 9, wherein the first buffer comprises a texture buffer, and each buffer location included in the first set of buffer locations includes a byte of data that indicates how many unique color codes are associated with the different pair of pixels corresponding to the buffer location.

11. The non-transitory computer readable medium of claim 9, further comprising populating the second set of buffer locations based on the first buffer, wherein, once populated, each buffer location included in the second set of buffer locations indicates how many unique color codes are associated with the different group of four pixels corresponding to the buffer location.

12. The non-transitory computer readable medium of claim 11, wherein generating the compressed stream comprises, for a first color code, determining whether the first color code is associated with a first pair of pixels included in the group of four pixels or with a second pair of pixels included in the group of four pixels.

13. The non-transitory computer readable medium of claim 12, further comprising, when the first unique color code is associated with the first pair of pixels, determining whether the first unique color code is associated with a first pixel included in the first pair of pixels or with a second pixel included in the first pair of pixels based on the buffer location included in the first set of buffer locations that corresponds to the first pair of pixels.

14. The non-transitory computer readable medium of claim 12, further comprising, when the first unique color code is associated with the second pair of pixels, determining whether the first unique color code is associated with a first pixel included in the second pair of pixels or with a second pixel included in the second pair of pixels based on the buffer location included in the first set of buffer locations that corresponds to the second pair of pixels.

15. The non-transitory computer readable medium of claim 11, further comprising combining the first buffer and the second buffer to generate a third buffer, and wherein generating the compressed stream comprises reading the first set of buffer locations from the third buffer.

16. The non-transitory computer readable medium of claim 9, further comprising transmitting the compressed stream of data to a remote computer for display on a remote display device.

17. A computing device, comprising:
a memory; and
a processor that executes instructions included in the memory to:
receive an input stream of data that includes color information associated with a block of pixels,
process the input stream of pixel data to generate a second stream of data, wherein, for each pixel in the block of pixels, the second stream of data indicates whether a second pixel that also is included in the block of pixels and is adjacent to the pixel in the block of pixels shares a color code with the pixel,
populate a first set of buffer locations included in a first buffer based on the second stream of data, wherein each buffer location corresponds to a different pair of pixels included in the block of pixels, and wherein, once populated, each buffer location included in the first set of buffer locations indicates how many unique color codes are associated with the different pair of pixels corresponding to the buffer location,
generate a second buffer that includes a second set of buffer locations, wherein each buffer location included in the second set of buffer locations corresponds to a different pair of buffer locations included in the first set of buffer locations and a different group of four pixels included in the block of pixels; and
generate a compressed stream of data that includes one or more compressed codes based on the second set of buffer locations, wherein each compressed code indicates a separate color code and a number of adjacent pixels included in the block of pixels that share the separate color code.

18. The computing device of claim 17, wherein the first buffer comprises a texture buffer, and each buffer location included in the first set of buffer locations includes a byte of data that indicates how many unique color codes are associated with the different pair of pixels corresponding to the buffer location.

19. The computing device of claim 17, wherein the processor further executes the instructions to populate the second set of buffer locations based on the first buffer, wherein, once populated, each buffer location included in the second set of buffer locations indicates how many unique color codes are associated with the different group of four pixels corresponding to the buffer location.

20. The computing device of claim 19, wherein generating the compressed stream comprises, for a first color code, determining whether the first color code is associated with a first pair of pixels included in the group of four pixels or with a second pair of pixels included in the group of four pixels.

* * * * *